United States Patent [19]
Hammonds

[11] Patent Number: 5,286,175
[45] Date of Patent: Feb. 15, 1994

[54] DYE INJECTION APPARATUS FOR A FUEL TERMINAL
[75] Inventor: Carl L. Hammonds, Humble, Tex.
[73] Assignee: Hammonds Technical Services, Inc., Houston, Tex.
[21] Appl. No.: 984,959
[22] Filed: Dec. 3, 1992
[51] Int. Cl.$^5$ .................. F04B 17/00; F04B 35/00
[52] U.S. Cl. .................. 417/375; 417/379; 366/136
[58] Field of Search .............. 417/375, 379, 390, 393; 366/167, 176, 136, 137

[56] References Cited
U.S. PATENT DOCUMENTS

| 2,163,436 | 6/1939 | Raymond et al. | 417/375 |
| 2,212,436 | 8/1940 | Clements | 417/375 |
| 2,916,998 | 12/1959 | Miller | 417/375 |
| 3,831,905 | 8/1974 | Htoo et al. | 366/136 |
| 4,002,325 | 1/1977 | Herfeld | 366/136 |
| 4,165,759 | 8/1979 | Tucker | 417/375 |

Primary Examiner—Richard A. Bertsch
Assistant Examiner—Alfred Basichas
Attorney, Agent, or Firm—Bush, Moseley & Riddle

[57] ABSTRACT

Apparatus for injecting dye in a fuel flow line is disclosed. The apparatus includes a fluid powered motor adapted for placement in a fuel flow line, a dye reservoir and a fluid injector connected between the reservoir and the flow line and driven by the fluid powered motor. The fluid powered motor, dye reservoir, and fluid injector are all housed within a container having a thermostatically controlled heater disposed in it. The arrangement insures that the temperature of dye applied to the fuel flow line is maintained above a certain level during cold weather, thereby preventing the viscosity of the dye from rising above a certain level and preventing clogging and fouling of the dye delivery system which may be caused by high viscosity of the dye.

10 Claims, 2 Drawing Sheets

DYE INJECTION APPARATUS FOR A FUEL TERMINAL

BACKGROUND OF THE INVENTION

1. Field of the Invention

This invention relates generally to apparatus for injecting small amounts of concentrated fluids into a line which already carries flowing fluids. The invention relates to an all weather injector system and in particular to an injector system for injecting concentrated dye into flowing fuel lines of fuel loading terminals.

2. Description of the Prior Art

Governmental environmental regulations in the United States and other countries require that fuel be "marked" with a dye in order that it may be identified as having particular uses, quality standards or a certain tax classification. Prior apparatus for adding dye to fuel at a loading terminal includes a large storage tank of concentrated dye (typically filled from multiple 55 gallon drums), apparatus for diluting the dye, and a pump for forcing diluted dye to a plurality of conduits or supply lines and controls running to various loading islands where the diluted dye is injected into a flowing fuel line prior to loading into a tank truck or other conveyance.

Typically such storage tank, pump and supply lines are placed in the open air in proximity to the multiple fuel loading islands. High viscosity of the dye during cold weather conditions inhibits performance of the system, so such prior systems have provided heaters for the tank and for the supply line running from the tank to the diluted dye-injecting islands at the loading terminal.

Furthermore, such prior art fuel dilution apparatus takes the concentrated dye from the large tank and dilutes the concentrated dye with as much as ninety-five percent "carrier" by volume. Such carriers include diesel fuel, stove oil, xylene, and aeromatics which may be added to the dye without undue contamination of the fuel.

A carrier performs two functions in prior fuel dying apparatus. First, the carrier adds volume to the ratio of injected fluid to the fluid in the fuel line. Such added volume is generally necessary in such prior apparatus, because common pressurized meter pulsed injectors used to inject the dye into a fuel line are not capable of injecting low volumes typically found in common dye concentrates. Consequently, in order to overcome the limitations of such common prior equipment, the volume of the fuel dye concentrate must be increased through dilution from a concentrated level of five to thirty parts per million (ppm) (dye to fuel ratio) to as much as one thousand ppm.

The second function of using a carrier with prior fuel dying apparatus has been to reduce the effects of changes in dye viscosity due to changes in ambient temperature. Dilution of the dye concentrate does not completely eliminate the problem, however, as evidenced by the need of heating tanks, pipes, pumps etc., exposed to the weather at a terminal loading facility.

IDENTIFICATION OF OBJECTS OF THE INVENTION

A primary object of the invention is to provide a system installation at a fuel loading terminal which applies small volumes and concentrated dye directly to the fuel line without dilution in all weather conditions.

Another object of the invention is to provide a system for applying concentrated dye directly to the fuel line rather than diluting it with a carrier such that the cost of the dye per gallon of fuel treated is reduced by eliminating the cost of the dilution carrier.

Another object of the invention is to provide a decentralized system for each fuel loading island of a fuel loading facility whereby small 5 gallon containers of dye may be used rather than a high volume storage tank filled with dye from 55 gallon drums, with resultant advantages of:
- reduced capital cost as compared to the cost of high volume tank storage of several thousand gallons filled by means of 55 gallon drums;
- easier disposal of 5 gallon containers as compared to the disposal of 55 gallon drums;
- less handling risk to personnel with 5 gallon containers as compared with 55 gallon drums;
- easier regulation of temperature and viscosity of dye in a 5 gallon container than with a high volume tank storage tank of several thousand gallon capacity; and
- reduced environmental liability of spilling a 5 gallon container as compared to spilling from a large storage tank.

Another object of the invention is to provide a decentralized dye injection system for each fuel loading island of a fuel loading facility to achieve the benefits of,
- a higher level of redundancy for an entire fuel loading facility as compared to a centralized system,
- a lower initial investment as compared to a single pressurized system with a high volume storage tank,
- less energy cost in controlling the temperature of dye, and
- less complexity.

Another object of the invention is to provide a decentralized dye injection system that prevents accidental leaks and spills of dye concentrate and eliminates large volume spills.

SUMMARY

The objects identified above as well as other advantages and features are incorporated in a decentralized dye injection system including a fluid powered motor adapted for placement in a fuel flow line so that when the motor is connected to the fuel line, it is powered by the fuel flowing in the line. The system includes a dye reservoir and one or more injectors connected between the dye reservoir and the flow line. Such fluid injector is driven by the fluid powered motor and injects tiny amounts of concentrated dye into the fuel line in coordination with the amount of fuel flowing in the line. The system further includes a heated container which houses the dye reservoir, the fluid injector and the fluid powered motor such that the temperature of the dye in the system is controlled to drop not below a predetermined temperature in cold weather conditions, thereby automatically controlling injector and dye performance.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
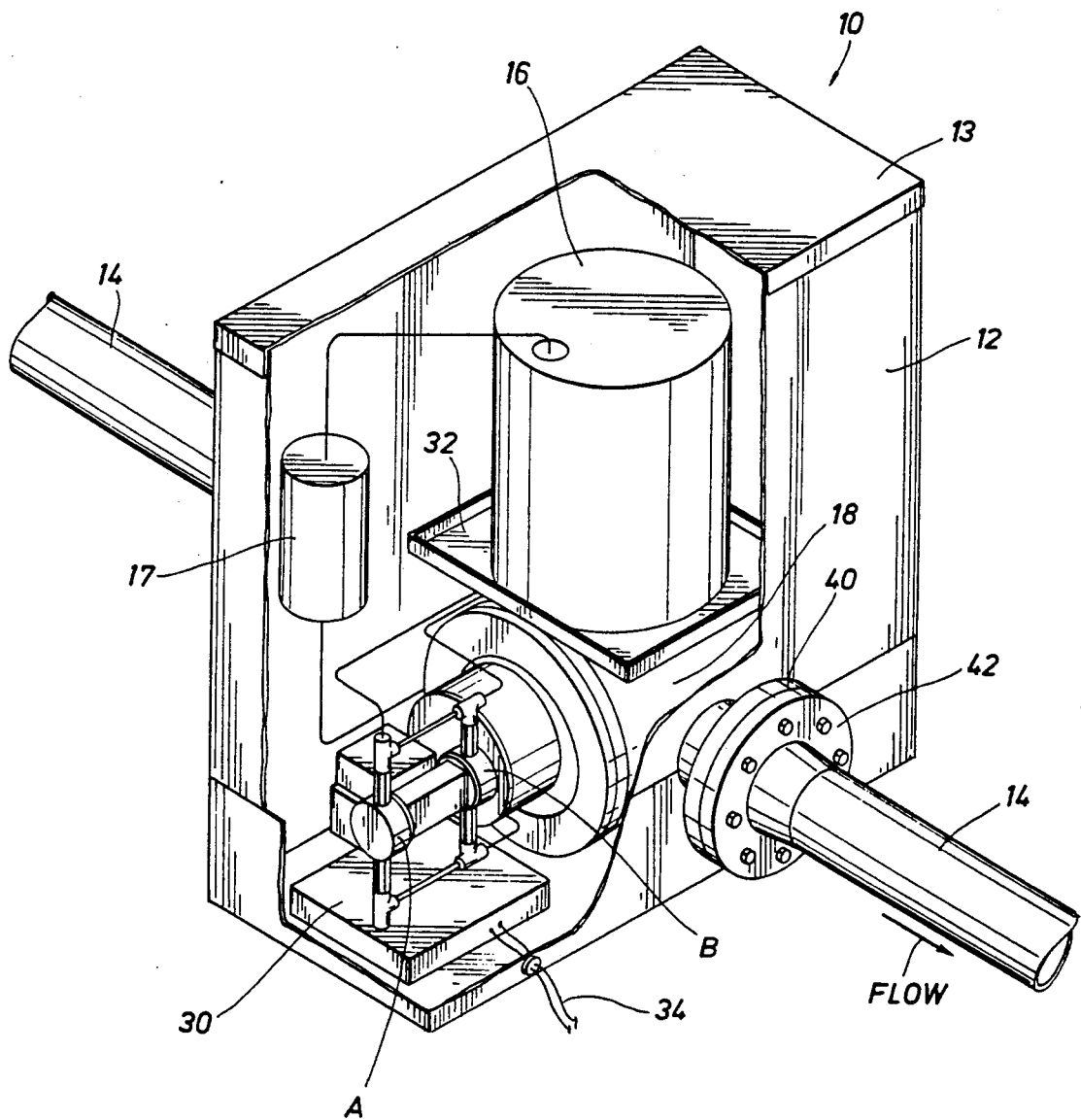
FIG. 1 is a perspective view of the apparatus for injecting dye in a fuel flow line, the view showing a container partially cut away to show generally the elements of the apparatus according to the invention.

FIG. 1 illustrates the dye injector system 10 of the invention which includes cabinet 12, preferably of stainless steel, which houses a fluid powered motor 18, an injector A, and (preferably a second injector B), a dye storage tank 16 and a sub-reservoir container 17. A thermostatically controlled heater 30 is placed within cabinet 12 to control the temperature of the elements within the cabinet.

The cabinet 12 includes inlet (not shown) and outlet flanges 40 which are attached to pipe which communicate with inlet and exit ports of fluid powered motor 18. When the system 10 is placed in service at a loading island of a fuel loading facility, flanges 40 are secured to flanges 42 of a fuel flow line 14 so that flowing fuel passes through motor 18 and drives the injectors A, and B. Although the fluid flow line 14 is shown in a horizontal orientation with respect to fluid powered motor 18, it may be placed in a vertical orientation also.

The fluid motor 18 of the apparatus is preferably a turbine or positive displacement motor commerically available from Hammonds Technical Services of Houston, Texas. The fluid motor 18 selected for the application described above and illustrated in FIGS. 1 and 2 should have performance characteristics suitable for providing linear proportionate-to-flow power to low ratio injection pumps A and B. A preferred motor from Hammonds Technical Services, Inc. of Houston, Texas, the assignee of this invention and patent rights, includes swinging self adjusting vanes which oscillate through a total arc of 45% in a full length socket. Such vanes are typically constructed of various synthetic resins having a coefficient of friction and compatibility with the fluid being handled. The vanes are turned by a combination of energy of the fluid flowing through it and centrifugal force. Such vanes are self adjusting. Suitable motors for use with the apparatus of this invention are the 800, 600 and 4T series of motors available from the above mentioned Hammonds Technical Services, Inc.

The injector A and injector B are identical pumps which operate independently of one another, except for being simultaneously driven by the output shaft of fluid powered motor 18. Preferred injector pumps are the 800 series which are commercially available from Hammonds Technical Services. Such pumps provide for a ratio of insertion fluid to fluid in the flow line from 5 to 50 ppm. Such injector pumps have all stainless steel wetted parts and Teflon ® elastomers which provide durability when used in dye service.

The dye storage tank 16 is preferably a 5 gallon can as packaged by a dye manufacturer. Such can is placed on a drip pan 32 with a directed drain (not illustrated) fastened atop fluid powered motor 18. The storage tank 16 and its drip pan 32 may be located elsewhere within cabinet 12 where fluid flow line is oriented vertically with respect to fluid powered motor 18. FIG. 1 also illustrates a sub-reservoir can or tank 17 disposed within cabinet 12. The connection of sub-reservoir 17 in the system 10 and its function therein is described below in detail.

An explosion proof heater 30 is placed within cabinet 12 under the components housed therein. An A.C. source is electrically connected by leads 34 to power such heater. Preferably, the cabinet 12 has its side walls and its top and bottom insulated to retain the heat from heater 30. A cabinet top 13 may be removed so that access to the interior of the cabinet 12 may be obtained by a service technician. If desired, cabinet 12 may be provided with doors or removable panels (not illustrated) on its sides to provide still further access to the interior by a service technician. Fluid conduits may be removed from an empty can or tank 16, the empty can removed, and replaced with a full can.

Figure 2:
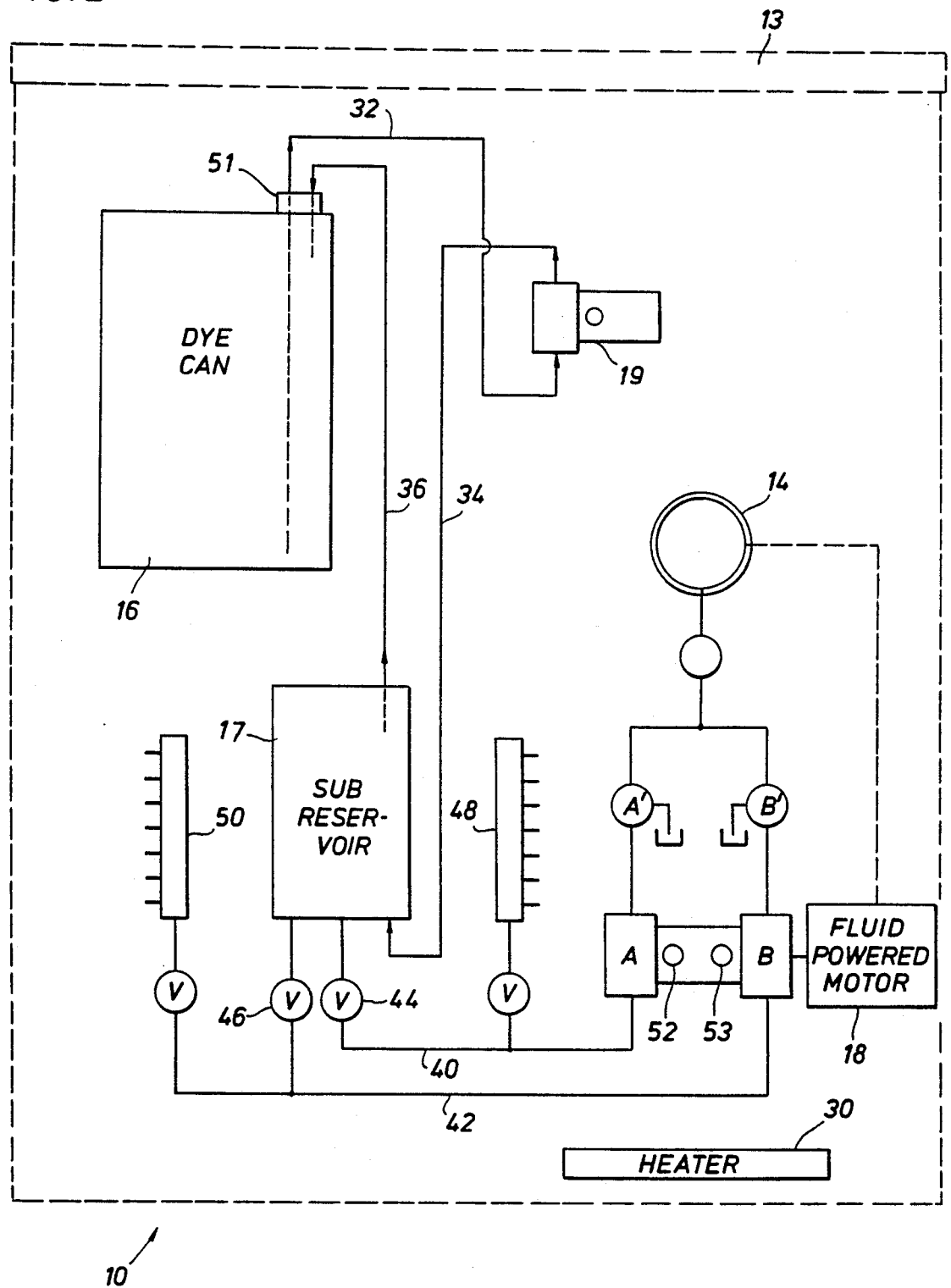
FIG. 2 is a block diagram illustrating the operation of the system.

FIG. 2 illustrates in schematic form the operation of the dye injection system of the invention. The product or fuel line 14 is shown by dotted line as driving fluid powered motor 18 which in turn drives injector pumps A and B.

The reservoir system of the dye injection system 10 includes a five gallon dye can 16, preferably the same container or package of the dye as supplied by a manufacturer of the dye. A sub-reservoir container 17 is also provided within cabient 12. A conduit 33 extends from the bottom of reservoir or can 16 to the inlet of a circulation pump 19. Another conduit 34 extends from the outlet of pump 19 to the bottom of sub-reservoir or container 17. Still another conduit 36 extends from the top of sub-reservoir 17 to the return port of siphon tube adapter 51 that replaces the standard factory lid to can 16. Such a system provides a dye circulation and delivery system to injector pumps A and B via conduits 40, 42 connected to the bottom of sub-reservoir 17. Such a system maintains an uninterrupted supply of dye to the injector pumps that is unaffected by changes in the level of dye supply in can 16, the temperature of the atmosphere outside of cabinet 12 or the setting components found in most concentrated dyes or fuel additives. In other words, the continuously circulating fluid does not allow heavier components time to settle out in the continuously moving fluid of the system. Such arrangement also aids in maintaining an air free environment to all wetted parts of the additive system. The arrangement also prevents residues from forming which could result from contact of dye with the atmosphere.

The sub-reservoir 17 provides a non-varying suction head pressure to injector pumps A and B via conduits 40 and 42. Such injector pumps are sensitive to changes in suction pressure. The constant pressure at the bottom of the sub-reservoir 17 caused by the constant volume of fluid within it regardless of the volume of fluid in dye can 16 assures consistent performance from the injector pumps A and B.

In addition, the sub-reservoir 17 allows for the 5 gallon dye can 16 to be replaced without disturbing the continuity of fluid supply to the injectors A and B. Such a feature is important because air is isolated from injector pumps A, B. Any air which finds its way to such pumps causes them to cavitate and lose performance. Air in such pumps may cause fuel dyes to dry and clog small components in the pumps such as valves.

Two injector pumps A and B are provided for redundancy. During preventive maintenance of the system, one or the other of the pumps may be taken out of service by closing one of the valves 44, 46 in lines 40, 42. The solenoids A' and B' provide a further electrically operated, means for controlling dye application into product line 14 from either injector pump A or B.

Calibration columns 48, 50 are connected to the suction or inlet side of injector pumps A and B. Such columns indicate the pressure of dye in each line to which they are connected and enable an operator to precisely measure the amount of dye or additive being injected. Adjustments in injector output may be made by an operator by varying the length of stroke of injector pumps A and B through the use of stroke adjustors 52 and 53.

The temperature within cabinet 12 is controlled by an explosion proof conduction heater 30. Preferably the heater includes a thermostatic control and is powered by 110 or 220 VAC @500 watts maximum. The heating system (including heater and insulated cabinet) is preferably designed to maintain an operating environment for the additive, storage and injectors between 50°-70° F., thereby further guaranteeing consistency in system performance regardless of outside temperature. Other heaters may be substituted for the heater 30 as will be obvious to routineers in the art of heating small enclosed spaces.

Cabinet 12 is further constructed to provide 150% spill containment for the volume of additive contained at any given time in both the dye storage tank 16 (factory container) and the sub reservoir 17. Such construction includes a bottom portion of the cabinet 12 which is leak proof.

As a result of the provision of the dye injection system described in detail above, each of the objects identified previously are provided.

Various modifications and alterations in the described apparatus will be apparent to those skilled in the art of the foregoing description which does not depart from the spirit of the invention. For this reason, these changes are desired to be included in the appended claims. The appended claims recite the only limitations of the present invention and the descriptive manner which is employed for setting forth the embodiments and is to be interpreted as illustrative and not limitative.

What is claimed is:

1. Apparatus for injecting dye in a fuel flow line (14) comprising:
    a fluid powered motor (18) adapted for placement in said fuel flow line (14) so that when said motor is connected to said flow line it is powered by fluid flowing in said flow line,
    a dye reservoir means including a dye storage tank,
    fluid injector means (A) in fluid communication with said dye reservoir means and driven by said fluid powered motor for injecting dye into said fuel flow line,
    a cabinet (12) substantially enclosing said fluid powered motor, said dye storage tank and said fluid injector means, and
    heating means (30) for maintaining the temperature within said cabinet above a predetermined temperature, thereby maintaining the viscosity of said dye below a predetermined level for injection within said fuel flow line.

2. The apparatus of claim 1 wherein
    said heating means comprises an explosion proof heater disposed within said cabinet.

3. The apparatus of claim 1 wherein said dye reservoir includes
    a primary tank (16),
    a secondary tank (17), and
    means for circulating dye from the bottom of said primary tank to the bottom of said secondary tank and from the top of said secondary tank to the top of said primary tank, and
    said fluid injector means is connected to the bottom of said secondary tank.

4. The apparatus of claim 1 wherein said dye reservoir means includes
    a container of dye (16) as shipped from a dye manufacturer, and
    means for transferring dye within said container to said fluid injector means.

5. The apparatus of claim 4 wherein said means for transferring dye includes
    a sub-reservoir,
    a circulating means between said reservoir and said sub-reservoir for circulating dye between said container and said sub-reservoir, and
    line means for transferring dye from the bottom of said sub-reservoir to said fluid injector means.

6. The apparatus of claim 4 further including
    a drip pan positioned within said cabinet, and
    wherein said container of dye is removably supported on said drip pan.

7. The apparatus of claim 5 wherein said container of dye includes
    a siphon tube adapter arranged to connect with said container of dye and said circulating means via a removable cap of said container.

8. Apparatus for injecting concentrated fluid in a fuel flow line adapted to be positioned between spaced upstream and downstream end portions of said flow line; said apparatus comprising:
    a cabinet having an inlet and outlet adapted to be positioned in a fuel flow path between said spaced upstream and downstream end portions with said inlet in fluid communication with said upstream end portion and said outlet in fluid communication with said downstream end portion to permit continuous fluid flow through said flow line;
    a fluid powered motor within said cabinet between said inlet and outlet and powered by fluid flowing in said flow line;
    a storage tank of concentrated fluid within said cabinet;
    fluid injection means within said cabinet in fluid communication with said storage tank of concentrated fluid and driven by said fluid powered motor for injecting concentrated fluid into said fuel flow line; and
    heating means for maintaining the temperature within said cabinet above a predetermined temperature to maintain the viscosity of said concentrated fluid below a predetermined level for injection within said fuel flow line.

9. Apparatus for injecting concentrated fluid as set forth in claim 8 wherein said heating means in enclosed within said cabinet and said storage tank is positioned over said fluid powered motor.

10. Apparatus for injecting concentrated fluid as set forth in claim 8 wherein flanges extend about said inlet and said outlet externally of said cabinet adapted for connection to said upstream and downstream end portions of said fuel flow line.

* * * * *